UNITED STATES PATENT OFFICE.

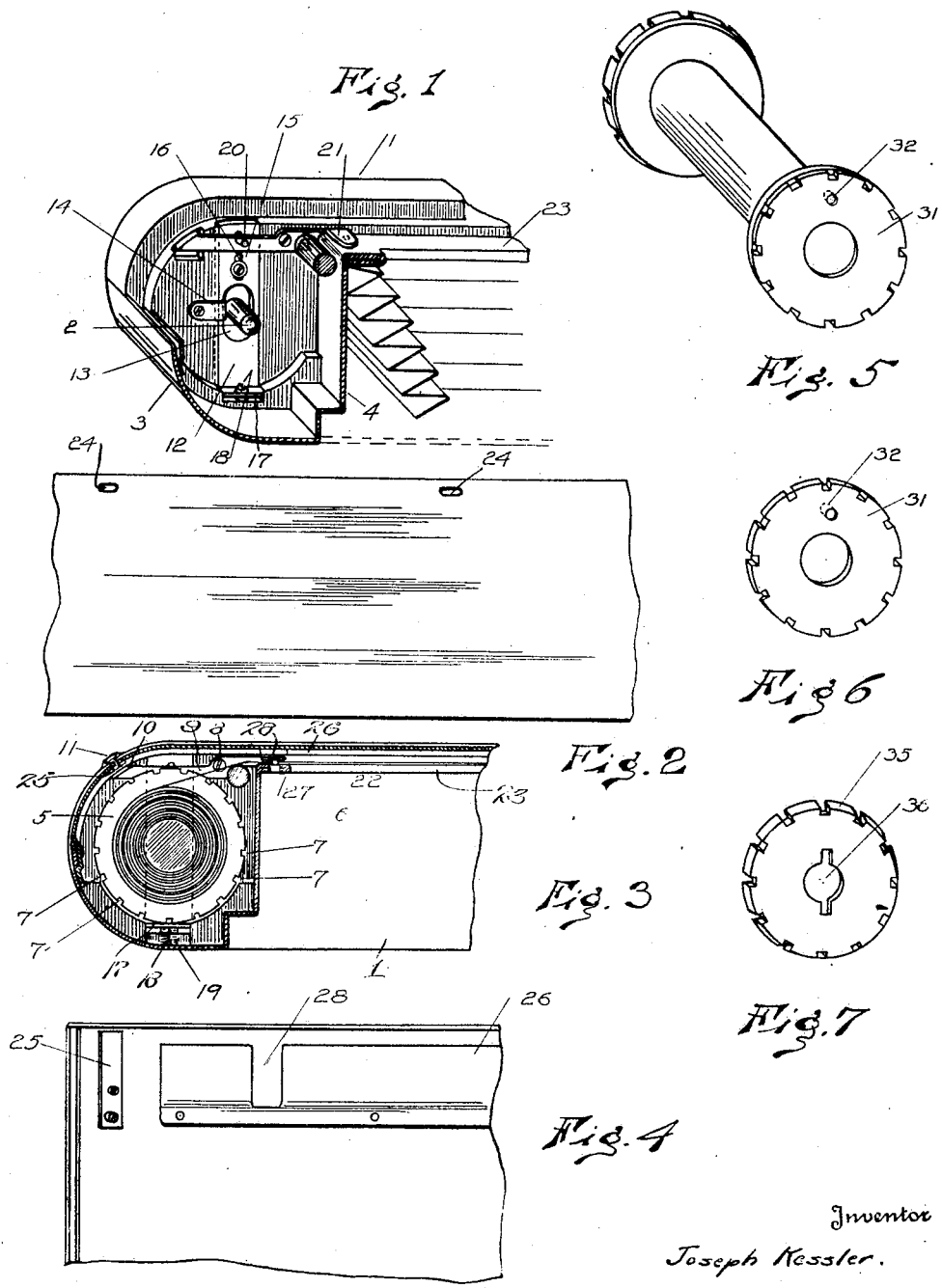

JOSEPH KESSLER, OF ROCHESTER, NEW YORK.

FILM-STOPPING DEVICE.

1,367,268. Specification of Letters Patent. Patented Feb. 1, 1921.

Application filed December 31, 1919. Serial No. 348,687.

*To all whom it may concern:*

Be it known that I, JOSEPH KESSLER, a citizen of the United States, residing at Rochester, in the county of Monroe and State of New York, have invented certain new and useful Improvements in Film-Stopping Devices, of which the following is a specification.

The object of this invention is to provide a new and improved form of locking device for films.

This and other objects of the invention will be illustrated in the drawings, described in the specification and pointed out in the claims at the end thereof.

In the drawings,

Figure 1 shows a perspective view of the feed controlling mechanism located at the winding end of the camera, the camera being shown partly broken away.

Fig. 2 is a plan view of the film and backing strip in connection with which my invention is used.

Fig. 3 is a vertical section across the winding spool of the camera showing the parts associated therewith in the camera.

Fig. 4 is a plan view of the back of the camera partly broken away.

Fig. 5 is a perspective view of a spool showing a modification of my invention.

Fig. 6 is a perspective view of the right hand end of the spool shown in Fig. 5.

Fig. 7 is a perspective view of the left hand end of the spool shown in Fig. 5.

In the drawings, like reference numerals indicate like parts.

In the drawings, reference numeral 1 indicates the camera casing. 2 indicates the spindle on which the film spool is mounted to rotate. 3 and 4 indicate parts of the casing which are used to exclude the light from the chamber in which the spool revolves. On the spindle 2 is mounted to rotate the spool 5 having a film 6 wound thereon. This spool has flanged ends, one of which is notched at 7, 7 at frequent intervals as shown in Fig. 3. Pivotally mounted at 8 is a lever 9 having an upturned end 10 at the left hand end forming a plate. This plate normally stands under the button 11 placed in the back of the camera so that by pressing in the button the lever 9 is rocked on the center 8.

At the end of the spool compartment is placed the slide 12 having an elongated opening 13 therein by which it passes around the spindle 2. It is held in place by a bracket 14 and a screw 15 that passes through an elongated slot 16 in the plate. The slots 13 and 16 permit endwise movement of the plate 12. The plate 12 at its lower end is upturned at 17 and carries a pin 18 in the upturned end, which pin is adapted to engage with the notches 7, 7 in the flange on the end of the spool. The upturned end 17 and slide 12 are normally pressed upward by the spring 19 so that the pin 18 is normally engaged with one of the notches 7.

At the upper end of the slide 12 is carried a pin 20 that engages with the lever 9 and normally holds it in the position shown in Figs. 1 and 2. At the right hand end of the lever is formed an offset plate 21 which extends out over the film and carries on the under side thereof a pin 22. When the slide 12 is raised, the lever 9 is rocked around the center 8 and the right hand end of it is forced down with the pin 22 in contact with the film. The film passes over the guide 23 and under the plate 21 and onto the spool. This film and backing strip is perforated at regular intervals as indicated at 24, 24, and when one of the perforations 24 comes under the pin 22, the pin will drop down into the opening and permit the pin 18 to rise and engage with a notch 7 on the flange of the spool and arrest the further forward movement of the film and lock it against all forward and backward movement. While the pin 22 rests on top of the film, the left hand end of the lever 9 will be pressed down and will carry with it the slide 12 and will hold the pin 18 out of engagement with the notches 7 in the end of the spool. When the pin 22 drops into the perforation 24, it is impelled by the spring 19 which raises the upper end of the lever. The lever 9 may be rocked by pressing on the button 11 which will cause the lifting of the pin 22 out of engagement with the film and will depress the pin 18 out of the notch 7. In this manner the film spool will be released and can be wound forward by the handle or key provided therefor. When the next perforation 24 comes opposite the pin 22, the pin will again drop and permit the pin 18 to rise, locking the spool and film against further movement.

The button 11 is normally held raised by the spring plate 25.

Inside of the back of the camera is placed a guide 26 between which and the platen 27 the film passes. The guide 26 is recessed at 28 to allow the plate 21 to rise therein as the button 11 is depressed and the platen 27 is perforated to receive the pin 22.

The perforations 24 are arranged so that they will engage the pin 22 at the same time that the numbers on the backing strip come under the sight opening in the back of the camera and in this manner the film will be positively arrested in the correct exposure positions.

In Figs. 5, 6 and 7 I have shown a modification of my invention in which a locking disk is shown at either end of the spool as an extra attachment or as a permanent feature of the camera. In either case the locking disk is made of relatively thick material to insure engagement of the pin 18 therewith. In Fig. 6 the locking disk 31 is shown having a pin 32 thereon which engages with an opening in the disk on the end of the spool so as to force the two parts to rotate or stand still together. In Fig. 7 I have shown the locking disk 35 having the elongated opening 36 therein, corresponding to a similar opening in the end of the spool at that end. The winding key with its fins engages with both the disk and the spool so that if the disk 35 is locked by the pin 18, the spool will be locked as well through the key.

I claim:

1. A film locking device comprising a spool having a flanged end with notches therein, a slide mounted to move across the end of the spool, said slide having an upturned end, a pin in said upturned end engaging with said notches to lock the spool.

2. A film locking device comprising a spool having a flanged end with notches therein, a slide mounted to move across the end of the spool, said slide having an upturned end, a pin in said upturned end engaging with said notches to lock the spool, a spring adapted to move said slide and engage said pin with said notches.

3. A film locking device comprising a spool having a flanged end with notches therein, a slide mounted to move across the end of the spool, said slide having an upturned end, a pin in said upturned end engaging with said notches to lock the spool, a platen over which said spool is adapted to draw a film, a lever pivotally mounted adjacent to said platen having a pin in the end thereof adapted to engage in an opening in said platen and pass through perforations in said film and lock the film.

4. A film locking device comprising a spool having a flanged end with notches therein, a slide mounted to move across the end of the spool, said slide having an upturned end, a pin in said upturned end engaging with said notches to lock the spool, a platen over which said spool is adapted to draw a film, a lever pivotally mounted adjacent to said platen having a pin in the end thereof adapted to engage in an opening in said platen and pass through perforations in said film and lock the film, means for simultaneously releasing both the spool and film for movement.

In testimony whereof I affix my signature.

JOSEPH KESSLER.